United States Patent [19]

Deitch et al.

[11] 3,927,275

[45] Dec. 16, 1975

[54] TELEPHONE ISOLATION JACK PANEL

[75] Inventors: James C. Deitch, Bloomington; Lawrence A. Robert, Minneapolis, both of Minn.

[73] Assignee: Magnetic Controls Company, Minneapolis, Minn.

[22] Filed: Nov. 5, 1974

[21] Appl. No.: 520,964

[52] U.S. Cl. ................................ 179/97; 339/217 J

[51] Int. Cl.² .......................................... H04Q 1/02

[58] Field of Search........ 179/1 PC, 52, 91 R, 91 A, 179/95, 96, 97, 98; 339/177, 182 R, 183, 217 J, 258

[56] References Cited

UNITED STATES PATENTS

| | | | |
|---|---|---|---|
| 357,538 | 2/1887 | Scribner | 179/97 |
| 2,103,501 | 12/1937 | Waldron et al. | 178/91 R |
| 3,537,061 | 10/1970 | Haag et al. | 339/183 |
| 3,668,324 | 6/1972 | Firestone | 179/1 PC |

FOREIGN PATENTS OR APPLICATIONS

| | | | |
|---|---|---|---|
| 411,782 | 6/1934 | United Kingdom | 179/91 A |

*Primary Examiner*—Kathleen H. Claffy
*Assistant Examiner*—Randall P. Myers
*Attorney, Agent, or Firm*—Neil B. Schulte

[57] ABSTRACT

A telephone equipment jack panel for use in circuits where high voltages may be present wherein each jack is surrounded by and enclosed in a plastic support. A plurality of these supports are mounted in a row on a base and further enclosed by a cover which provides access to the jacks only through holes positioned a predetermined distance from the entrance ends of the jacks so that the jacks may be reached only by the insertion of a special highly insulated plug.

5 Claims, 3 Drawing Figures

TELEPHONE ISOLATION JACK PANEL

BACKGROUND OF THE INVENTION

In the prior art information about the condition of power transmission facilities is transmitted over telephone lines between the power facilities. Very large voltages may be present in these facilities. The information is transferred to the telephone lines through suitable isolation transformers and jack panels. Supposedly the transformers should isolate the high voltages from the telephone circuits but it is always possible that some failure in one or more components will result in a large voltage being present somewhere on the telephone jack panel. To protect against this safety hazard the present invention provides an isolation jack panel for use in connecting the transformer to the telephone lines. This isolation jack panel prevents any injury even if the transformer fails and allows large voltages to reach the jack panel connection point.

BRIEF SUMMARY OF THE INVENTION

Briefly, the present invention comprises an isolation jack panel in which individually molded plastic jack supports are provided for each pair of jacks. The jack support is molded to include a separate cavity for each jack with the cavities opening in opposite directions so that the jacks are totally isolated from each other. Several of the supports are mounted in a line on a suitable base and the entire assembly is covered by an insulating cover so that access to the ends of the jacks can be had only through holes in the top of the cover. These holes are designed to accept only a special highly insulated plug which permits one jack to be connected to an adjacent jack so as to provide a connection between the power station equipment and the telephone line. Each jack support is further provided with risers between the entrance ends of the jacks to increase the electrical insulation therebetween and a pair of recesses in the top surface of the support at the points surrounding the jack entrance. These features, along with other features which will be described hereinafter, provide a maximum of electrical insulation around the jacks. It may therefore be seen that it is an object of our invention to provide an improved telephone jack panel for use where high voltages may be present which provides a great deal of electrical insulation to protect any service personnel and to prevent shorts between adjacent circuits. Further objects and advantages will become apparent from the following detailed description and drawings.

DESCRIPTION OF THE PREFERRED EMBODIMENT

Figures 1, 2, 3:
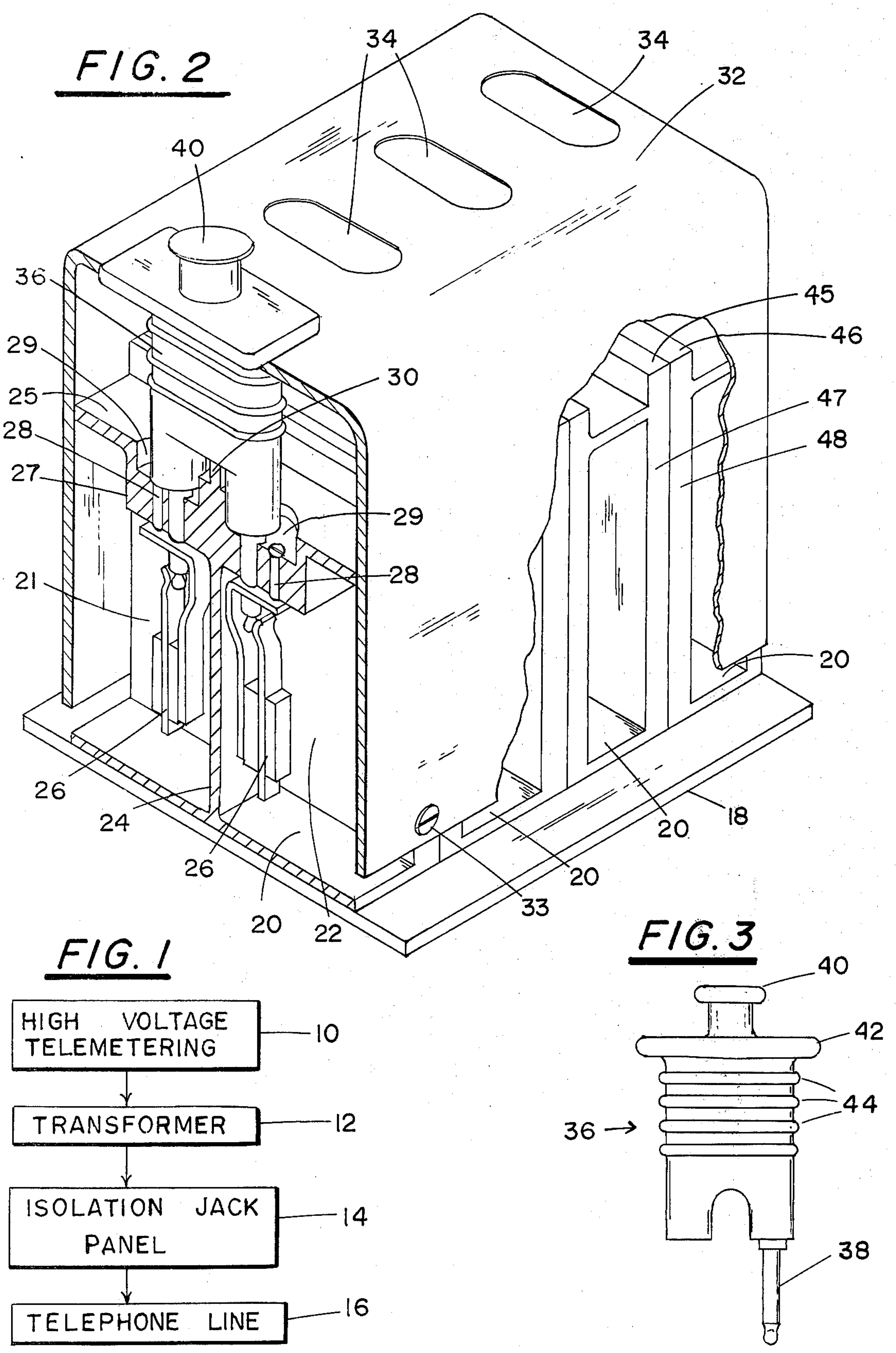
FIG. 1 is a schematic diagram showing the location of the present invention in the circuits related to high voltage telemetering.
FIG. 2 is a perspective, partially cut away, partially sectioned view of the telephone isolation jack panel of the present invention with the insulated plug therein.
FIG. 3 is an elevational view of another plug which can be used with the jack panel of the present invention.

In FIG. 1 a schematic diagram is presented showing the position in the telemetering circuit of the present invention. The signal information from the high voltage telemetering circuits 10 is presented to an isolation transformer 12. Transformer 12, when operating properly, is supposed to isolate all high voltages and pass through only an information signal suitable for transmission on telephone circuits. This information signal is connected by means of an isolation jack panel 14 to the telephone line 16. If some failure occurs in transformer 12, or for some reason the local ground is at an elevated voltage, it is possible that a workman making the connections in isolation jack panel 14 could receive a dangerous shock. To prevent this a new high voltage isolation jack panel may be utilized which comprises the present invention as shown in FIG. 2.

In FIG. 2 it may be seen that a base 18 is used to mount a series of jack supports 20. Each jack support 20 may be molded from plastic having a high dielectric strength. The supports 20 each include a pair of side walls 47 and 48 and oppositely opening cavities 21 and 22 separated by a dividing wall 24. The top surface 25 of support 20 is molded with a thicker portion 27 which provides a mounting point for a pair of telephone jacks 26 constructed in a manner well known to those skilled in the art. In FIG. 2, jacks 26 are shown as single pole jacks although multiple pole jacks may be utilized as well. The jacks are mounted into holes in the thick portion 27 of support 20 by means of a pair of screws 28. The entrance ends of the jacks emerge on the top side of thick portion 27 in small recesses 29 in the top of thick portion 27. Recesses 29, along with a riser 30 and risers 45 and 46 ensure that the entrance ends of the jacks 26 are completely isolated from contact with any external objects and that the amount of surface area between the jacks is maximized to preclude any short circuit paths.

A cover 32, which is also formed out of a suitable highly insulating plastic, is positioned over all of the jack supports 20 in the position shown and may be secured in place by any suitable means, as for example screws 33. A series of openings 34 are formed in the top of cover 32 in alignment with each of the supports 20. The only access to the entrance ends of jacks 26 is by means of holes 34 which are spaced a predetermined distance above the entrance ends of the jacks by virtue of the position of cover 32. To connect one jack to another it is necessary to insert a plug 36 through a hole 34. Plug 36 may be internally wired so as to carry signal information from one jack through the plug 36 to the other jack. Alternatively, the plug may include only one connecting stub 38 such as shown in FIG. 3.

The plug in FIG. 3 could be wired internally to connect the two contacts in one of the jacks together to terminate or loopback the circuit. A plug of the configuration shown in FIG. 3 could be used to simply short out one circuit or provide a means to connect to one of the circuits by being insertable into only one of the jacks in support 20. Whether a single stub 38 is utilized, or dual stubs are used such as shown in FIG. 2, the plug itself has a similar construction. This construction includes a small grasping stub 40 on the top, an overlapping flange 42, and a number of ridges 44 which serve to increase the electrical resistance of any surface paths that may exist in accordance with principles well known to those skilled in the art.

It may therefore be seen that our invention provides a jack panel with a high degree of isolation wherein the entrance ends of the jacks are mounted in recesses 29 on opposite sides of the riser 30 at a safe distance from the opening 34 so that it is virtually impossible for service personnel to come into contact with the entrance ends of the jacks. Furthermore, the configuration of the jack supports 20 with their oppositely facing cavities and risers 30, 45 and 46 ensures that the jacks are totally and completely isolated from each other so that the chance of any short circuits is virtually nil. Also the support side walls 47 and 48 completely isolate each pair of jacks from the adjacent pairs of jacks. Of course, some minor variations could be made to the structure shown in the drawings without departing from the spirit and scope of the invention and therefore I intend to be limited only to the appended claims.

We claim:

1. A telephone jack panel for use in telephone circuits where high voltage may be present comprising in combination:

a plurality of jacks;

a base;

a plurality of electrically insulating jack support means on said base, each of said support means including at least one cavity for holding the jack, said support means completely surrounding the jack on top, bottom, and sides except for one side, the missing side allowing the cavity to open in a direction away from the other jack cavities so as to provide maximum electrical isolation between the jacks;

an electrically insulating cover enclosing said jack support means and closing said one side, said cover spaced from the entrance ends of said jacks in said support means, and said cover having a plurality of holes aligned with the entrance ends of the jacks, said jack panel adapted to receive insulated plugs which plugs are shaped to fit through the holes in the cover and extend into the entrance ends of the jacks.

2. The apparatus of claim 1 in which said jack support means comprise a plurality of electrically insulating jack supports, each of said jack supports adapted to mount a pair of said jacks therein in generally parallel positions with the entrance ends of the jacks accessible through holes in the top of said support means, and each of said supports including first and second cavities with the first cavity holding one of the jacks and the second cavity holding the other jack, the cavities opening in opposite directions to provide maximum electrical isolation between the two jacks.

3. The apparatus of claim 2 in which the entrance ends of the jacks are mounted in recesses in the supports.

4. The apparatus of claim 2 including a riser formed on each of said supports at a location between the entrance ends of said jacks to increase the electrical isolation therebetween.

5. The apparatus of claim 3 in which the entrance ends of the jacks are mounted in recesses in the supports.

* * * * *

UNITED STATES PATENT OFFICE
CERTIFICATE OF CORRECTION

Patent No. 3,927,275 Dated December 16, 1975

Inventor(s) James C. Deitch, et al

It is certified that error appears in the above-identified patent and that said Letters Patent are hereby corrected as shown below:

"Claim 5, Column 4, line 25, "claim 3" should read;

-- claim 4 --."

Signed and Sealed this

*fourth* Day of *May 1976*

[SEAL]

*Attest:*

RUTH C. MASON
*Attesting Officer*

C. MARSHALL DANN
*Commissioner of Patents and Trademarks*